United States Patent
Fraschetti et al.

(10) Patent No.: US 12,466,163 B2
(45) Date of Patent: Nov. 11, 2025

(54) HEATING FLOOR PANEL FOR TRANSPORT MEANS

(71) Applicant: I.R.C.A. S.P.A. INDUSTRIA RESISTENZE CORAZZATE E AFFINI, Vittorio Veneto (IT)

(72) Inventors: Stefano Fraschetti, Bertrange (LU); Ivan Poser, Cappella Maggiore (IT); Andrea Taurian, Porcia (IT); Federico Zoppas, Treviso (IT)

(73) Assignee: I.R.C.A S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 940 days.

(21) Appl. No.: 17/621,672

(22) PCT Filed: Jul. 2, 2020

(86) PCT No.: PCT/IB2020/056243
§ 371 (c)(1),
(2) Date: Dec. 21, 2021

(87) PCT Pub. No.: WO2021/005465
PCT Pub. Date: Jan. 14, 2021

(65) Prior Publication Data
US 2022/0355578 A1    Nov. 10, 2022

(30) Foreign Application Priority Data
Jul. 5, 2019 (IT) .................. 102019000010959

(51) Int. Cl.
*B32B 15/14* (2006.01)
*B32B 3/08* (2006.01)
(Continued)

(52) U.S. Cl.
CPC .............. *B32B 15/14* (2013.01); *B32B 3/08* (2013.01); *B32B 5/028* (2013.01); *B32B 5/18* (2013.01);
(Continued)

(58) Field of Classification Search
CPC ........... B32B 15/14; B32B 3/08; B32B 5/028; B32B 5/18; B32B 5/245; B32B 7/12;
(Continued)

(56) References Cited

U.S. PATENT DOCUMENTS 6,294,768 B1 *  9/2001  Liebich .................... H05B 3/36
                                                  219/217
6,552,310 B1 *  4/2003  Hulldin .................. F24D 13/02
                                                  219/217
(Continued)

FOREIGN PATENT DOCUMENTS

CN     1323383 A    11/2001
CN    202692216 U    1/2013
(Continued)

OTHER PUBLICATIONS

International Search Report, dated Oct. 16, 2020, for corresponding International Patent Application No. PCT/IB2020/056243.

*Primary Examiner* — Brian W Jennison
(74) *Attorney, Agent, or Firm* — Amster, Rothstein & Ebenstein LLP

(57) ABSTRACT

A floor panel illustratively for a transport vehicle. The floor panel includes a metal plate and at least one heating cable adapted to generate heat when electric current flows therethrough. A net is provided with a plurality of openings and the at least one heating cable is arranged between the net and the metal plate, such that the at least one heating cable is in contact with the metal plate. The floor panel also includes an insulative layer adapted to limit transmission of heat pro-
(Continued)

duced by the at least one heating cable and the net is arranged between the layer and the metal plate. The insulative layer is fixed to the metal plate by an adhesive, and the at least one heating cable is positioned or immersed in the adhesive, except for a surface portion of the at least one heating cable which is in contact with the metal plate.

13 Claims, 4 Drawing Sheets

(51) Int. Cl.
*B32B 5/02* (2006.01)
*B32B 5/18* (2006.01)
*B32B 5/24* (2006.01)
*B32B 7/12* (2006.01)
*B32B 15/20* (2006.01)
*B32B 37/12* (2006.01)
*B61D 27/00* (2006.01)
*B63J 2/12* (2006.01)
*H05B 3/06* (2006.01)

(52) U.S. Cl.
CPC .............. *B32B 5/245* (2013.01); *B32B 7/12* (2013.01); *B32B 15/20* (2013.01); *B32B 37/12* (2013.01); *B61D 27/0045* (2013.01); *B63J 2/12* (2013.01); *H05B 3/06* (2013.01); *B32B 2262/101* (2013.01); *B32B 2266/0228* (2013.01); *B32B 2305/022* (2013.01); *B32B 2305/38* (2013.01); *B32B 2307/302* (2013.01); *B32B 2307/304* (2013.01); *B32B 2307/558* (2013.01); *B32B 2307/732* (2013.01); *B32B 2311/24* (2013.01); *B32B 2315/085* (2013.01); *B32B 2325/00* (2013.01); *B32B 2471/00* (2013.01); *B32B 2605/10* (2013.01); *B32B 2605/12* (2013.01); *H05B 2203/026* (2013.01)

(58) Field of Classification Search
CPC .............. B32B 15/20; B32B 2262/101; B32B 2266/0228; B32B 2305/38; B32B 2307/302; B32B 2307/304; B32B 2307/558; B32B 2307/732; B32B 2311/24; B32B 2315/085; B32B 2325/00; B32B 2471/00; B32B 2605/10; B32B 2605/12; H05B 3/06; H05B 2203/026
See application file for complete search history.

(56) References Cited

U.S. PATENT DOCUMENTS

| | | | |
|---|---|---|---|
| 8,288,689 B1 * | 10/2012 | Adelman | H05B 3/34 |
| | | | 219/241 |
| 9,290,890 B2 * | 3/2016 | Naylor | E01C 23/03 |
| 2012/0234819 A1 | 9/2012 | Berger | |
| 2014/0097169 A1 * | 4/2014 | Charron | H05B 3/28 |
| | | | 52/745.05 |

FOREIGN PATENT DOCUMENTS

| | | |
|---|---|---|
| GB | 2447748 A | 9/2008 |
| JP | 4992534 U | 8/1974 |
| JP | 2005315448 A | 11/2005 |
| JP | 3184066 U | 6/2013 |
| JP | 2016061557 A | 4/2016 |
| WO | 0025069 | 5/2000 |
| WO | 2011060340 A | 5/2011 |

* cited by examiner

HEATING FLOOR PANEL FOR TRANSPORT MEANS

CROSS REFERENCE TO RELATED APPLICATIONS

This application is a national phase of PCT application No. PCT/IB2020/056243, filed Jul. 2, 2021, which claims priority to IT patent application No. 102019000010959, filed Jul. 5, 2019, all of which are incorporated herein by reference thereto.

FIELD OF THE INVENTION

The present invention relates to a heating floor panel for transport means, in particular for trains, ships or boats.

In particular, the heating floor panel is adapted to generate heat when a component thereof is crossed by electric current, and it is adapted to be used for obtaining the floor of transport means, for example, the floor of a railway carriage or the floor of a ship.

BACKGROUND ART

Indoor environments of trains are typically heated. The most commonly used heating systems for such purpose comprise the outflow of hot air, which is introduced into the environment to be heated.

As a complement, or alternative to such systems, recently, heating panels are also being designed comprising a heating element of the electric type. Heating panels can be used, for example, to obtain the floors of railway carriages. However, heating panels at the state of the art have drawbacks.

One critical aspect of the current heating panels regards the assembly of the heating element with the panel. In particular, in some cases, first, a special recess is obtained in a part of the heating panel by means of a processing by chip removal.

Then, the heating element is inserted into the recess. However, this operation requires time, machinery and staff to implement it. Consequently, the production process is long and complex, so production costs are elevated.

Furthermore, fastening means must be comprised to ensure that the heating element stays constrained to the panel.

The fastening means are typically interposed between the heating element and the upper part of the panel, adapted to spread the heat produced by the heating element.

Such arrangement implies that a part of the heat produced by the heating element is absorbed by the fastening means, or nonetheless by an element interposed between the upper part of the panel and the heating element. Thus, the efficiency of the heat transmission is reduced.

The panel described in US2012234819A1 has the aforesaid drawbacks. Indeed, the heating element is incorporated in a layer of epoxy resin. Therefore, disadvantageously, the epoxy resin inevitably limits the transmission of heat. A further drawback of the panel described in such document comes from the way in which it must be obtained. Indeed, in particular, the epoxy resin must be poured into a mold, where the heating element is arranged, and it must be subjected to heat and pressure. Thus, the process is relatively complex and requires rather lengthy technical times, as well as the use of special instruments.

A further drawback of the known heating panels consists of the need to have to replace the entire panel, or in any case, to have to carry out complex operations of maintenance, in the event of a fault of the heating element of the panel.

A further drawback of known heating panels concerns the means of protection from electrical shock, which are currently relatively ineffective and difficult to produce.

Furthermore, disadvantageously, when the electric current crosses the heating element, undesired electromagnetic interference is generated.

Thus, the need is felt for a heating floor panel, which allows the drawbacks of the known heating panels to be overcome, in particular, but not only, those described previously.

SUMMARY OF THE INVENTION

It is an object of the present invention to obtain a heating floor panel of the electric type, which can be produced more easily and more quickly with respect to the state of the art.

It is another object of the present invention to obtain a heating floor panel, which also allows optimization of the transmission of heat.

The present invention achieves at least one of such objects, as well as other objects, which will be apparent in the light of the present description, by means of a floor panel for transport means, in particular for trains, ships or boats, the floor panel comprising a metal plate, at least one heating cable adapted to generate heat when it is crossed by electric current; a net, or layer provided with a plurality of openings, in particular meshes; wherein said at least one heating cable is arranged between the net, or layer, and the metal plate.

Said at least one heating cable is preferably, and advantageously, in contact, in particular directly in contact, with the metal plate, so as to optimize the transmission of heat. In particular, preferably, said at least one heating cable is also in contact, in particular directly in contact, with the net.

The invention also relates to a process for obtaining a floor panel, comprising at least the steps of:
providing said at least one heating cable constrained, preferably sewn, to the net, or layer;
arranging the net and said at least one heating cable in contact with the metal plate;
fixing a layer of material, said layer being adapted, in particular, to limit the transmission of heat produced by the at least one heating cable, to the metal plate, preferably by means of an adhesive;
preferably, wherein said layer is provided with a further plate, preferably made of metal, and wherein the layer is fixed to the metal plate so that the layer is between the metal plate and said further plate.

An person skilled in the art is capable of acknowledging that the process may be carried out quickly and easily.

The invention also relates to a component for a floor panel comprising said at least one heating cable and said net, or layer, provided with a plurality of openings, in particular meshes; wherein said at least one heating cable is constrained, preferably sewn, to the net; preferably wherein the net, or layer, comprises an adhesive side attached to said at least one heating cable and/or preferably wherein the dimensions of each opening in the net, or layer, are from 16 to 900 mm$^2$.

Advantageously, the openings or meshes of the net allow for the passage of an adhesive therethrough. Thus, a layer, for example, a layer adapted to limit the transmission of heat produced by the at least one heating cable (i.e. a layer of thermally insulating, and preferably electrically insulating material), can quickly and easily be fixed to the metal plate by means of the adhesive.

Advantageously, the meshes of the net also provide an adequate space to ensure that the aforesaid layer adapted to limit the heat transmission, or insulating layer, can be fixed to the metal plate by means of the adhesive.

A further advantage comes from the fact that said at least one heating cable can come into contact with the metal plate, and be immersed, in particular only partially immersed, in the adhesive, which acts as a thermal insulating means, to ensure that most of the heat is transmitted to the metal plate, which is adapted to be stepped on.

Furthermore, advantageously, since said at least one heating cable can come into contact, in particular directly in contact, with the metal plate, the transmission of heat is optimized, in particular because fixing means, such as the adhesive, or other elements, interposed between said at least one heating cable and the metal plate, are not provided.

Preferably, said at least one heating cable is constrained, in particular sewn, to the net. Advantageously, this guarantees that said at least one heating cable is already in the conformation chosen in accordance with the design.

To further facilitate the process, one side of the net is preferably adhesive. In this way, a component comprising the net and at least one heating cable constrained to each other can adhere to the metal plate, and such component is already held in position before using the adhesive with which the insulating layer is fixed to the metal plate.

Preferably, there are provided two heating cables, so that one of the heating cables can be used in the event of a fault of the other heating cable.

Preferably, each heating cable comprises therein two different electrically conductive wires (also called resistance wires) or two different bundles of electrically conductive wires.

In this way, the following advantages can be obtained, in particular, when the two wires of each cable are electrically connected in series to each other:
- a substantial reduction in the electromagnetic field generated by the heating cable. Indeed, the two different wires can be crossed by a respective current of equal intensity and in the opposite direction to each other, so that the resulting electromagnetic field is, for example, substantially null;
- the resistance of the two wires is added, so it is possible to obtain a cable with a shorter length;
- the electrical connections for supplying the heating cable are facilitated. The two wires, for example, can be short-circuited at one end and they can be powered by a generator connected to the other end, in particular, at the end opposite to the short-circuited end.

Preferably, each heating wire comprises an element, in particular, an electrically conductive shield, which envelops the two conductive wires. Advantageously, the electrically conductive element can be connected to the ground line and furthermore, it can act as a shield to avoid or limit electromagnetic interference, as well as an element for protecting from cuts or other mechanical damage.

Furthermore, advantageously, the electrically conductive element can be used to intercept dispersed currents deriving from the degradation of the insulators, in particular, of the sheath/s, of the heating cable. For example, the electrically conductive element can be connected to a protective device, for example, a differential, in particular a high-sensitivity differential. When the electrically conductive element is connected to such differential, it is possible to detect the potentially dangerous conditions in which the conductors of the heating cables deteriorate over time.

According to an aspect, the floor panel is particularly adapted to be stepped on, i.e. it has adequate structural characteristics so as to be stepped on without causing the floor panel to break.

Further features and advantages of the invention will be more apparent in the light of the detailed description of illustrative, but non-exclusive embodiments.

The dependent claims describe particular embodiments of the invention.

BRIEF DESCRIPTION OF THE FIGURES

In the description of the invention, reference is made to the attached drawings, which are provided by way of a non-limiting example, wherein.

The same elements, or functionally equivalent elements, have the same reference numeral.

DESCRIPTION OF EXAMPLE EMBODIMENTS OF THE INVENTION

Figure 1:
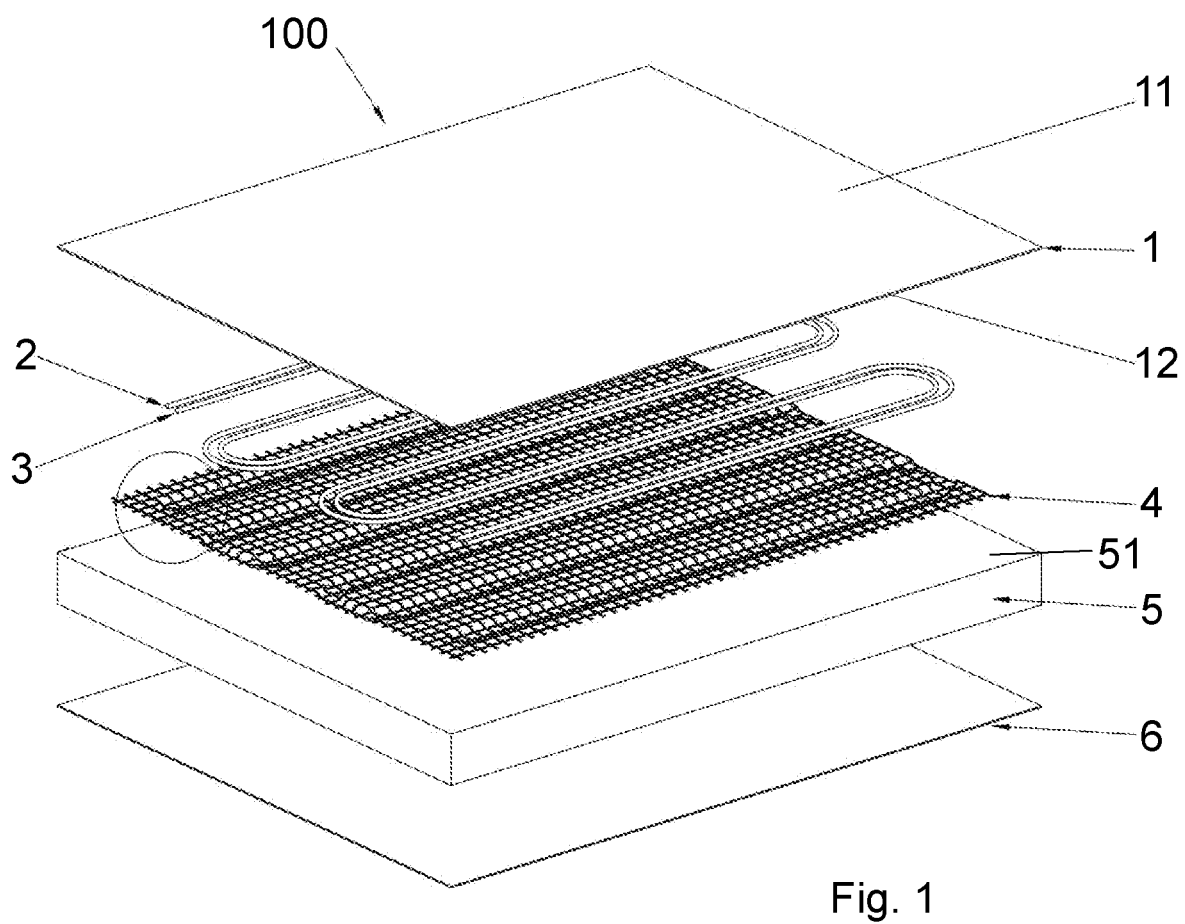
FIG. 1 illustrates an exploded perspective view of an example of a floor panel according to the invention.

A floor panel 100 according to the invention is described with reference to the Figures.

The floor panel 100 is configured to obtain the floor of a transport means, such as, for example, the floor of a railway carriage or the floor of a ship, in particular, of an indoor environment of a ship. For example, in order to obtain the floor, a plurality of floor panels 100 can be provided, set side by side.

The floor panel 100 comprises a metal plate 1; at least one heating cable 2, 3 adapted to generate heat when it is crossed by electric current, a net 4 provided with a plurality of openings or meshes 41; wherein said at least one heating cable 2, 3 is arranged between the net 4 and the metal plate 1.

In particular, the metal plate 1 serves to transmit, to the environment where the panel 100 is installed, the heat generated by the at least one heating cable 2, 3. Preferably, the metal plate 1 is made of aluminum or aluminum alloy.

The metal plate 1 can be covered, for example, by a covering layer (not shown), for example, made of a fabric or synthetic, adapted to be stepped on.

In particular, the metal plate 1 comprises a face 11 (or side), also called upper face for descriptive purposes, and a face 12 (or side), also called lower face for descriptive purposed. The face 11 and the face 12 are opposite to each other and they are preferably substantially flat.

In particular, the face 11 is adapted to be covered by said covering layer.

The plate 1 is suitable to be stepped on without breaking, and it is adapted to withstand impacts.

Preferably, the metal plate 1 has a thickness greater than, or equal to 1 mm, for example, from 1 to 20 mm, preferably from 1.5 to 2.5 mm.

The thickness of the metal plate 1 substantially corresponds to the distance between the face 11 and the face 12.

Figure 2:
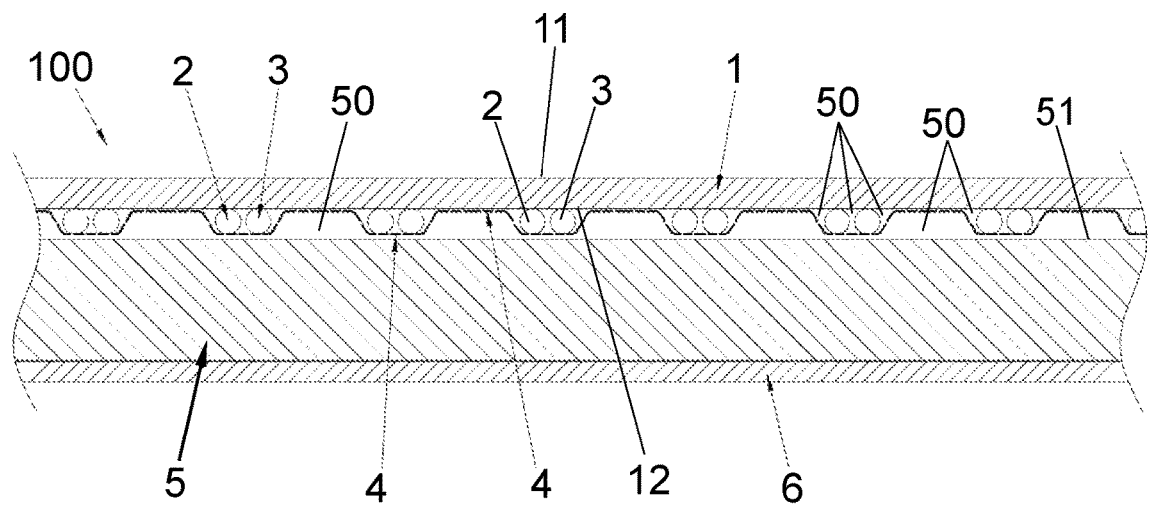
FIG. 2 illustrates a sectional view of the floor panel of FIG. 1.
Figure 3:
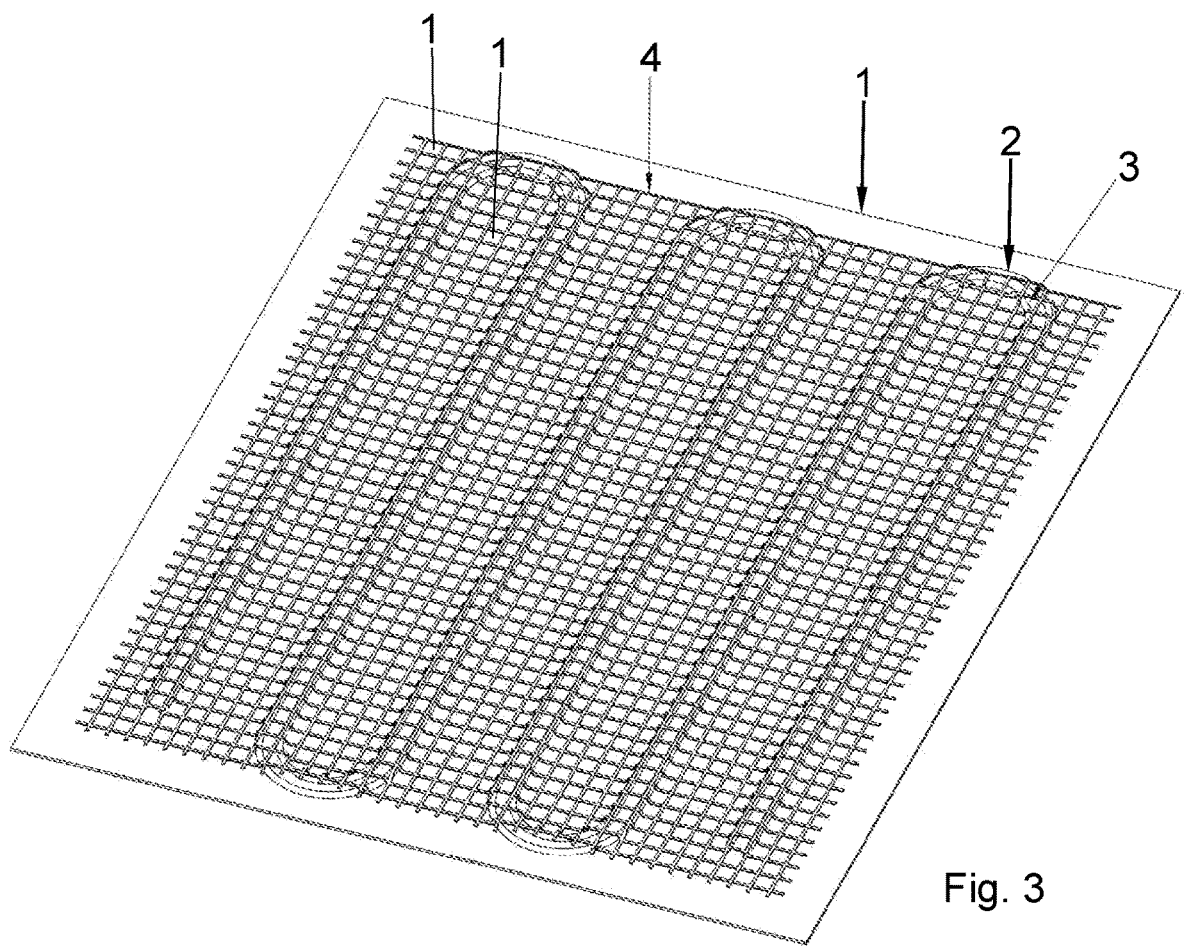
FIG. 3 illustrates a perspective view of some parts of the floor panel in FIG. 1.

Preferably, two heating cables 2, 3 are provided (as shown in FIGS. 1, 2 and 3), although the floor panel 100 can comprise only one heating cable or two or more heating cables, for example, two or three heating cables.

Preferably, the heating cables 2, 3 are equal, or substantially equal to each other. Advantageously, providing two heating cables 2, 3, the heating cable 2 can be used as the main heating cable and the other heating cable 3 can be used as an auxiliary heating cable, which is put into operation in the event of a malfunctioning of the heating cable 2. Thus, this avoids the entire floor panel having to be replaced in the event of a malfunctioning of only one of the heating cables 2, 3. When a third heating cable is optionally provided, for example, two cables can be used to modulate the power supplied, and one cable can be used as an auxiliary.

Figure 4:
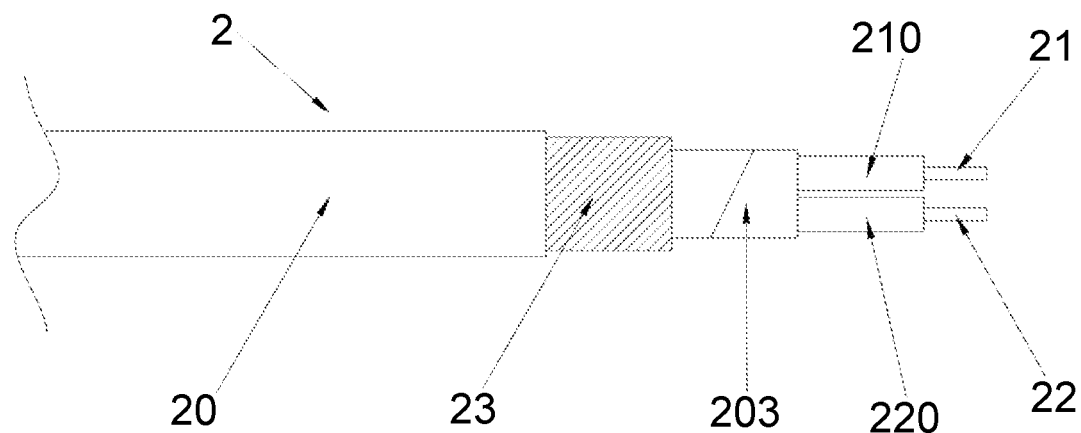
FIG. 4 schematically illustrates an example of a heating cable of a floor panel according to the invention.
Figure 5:
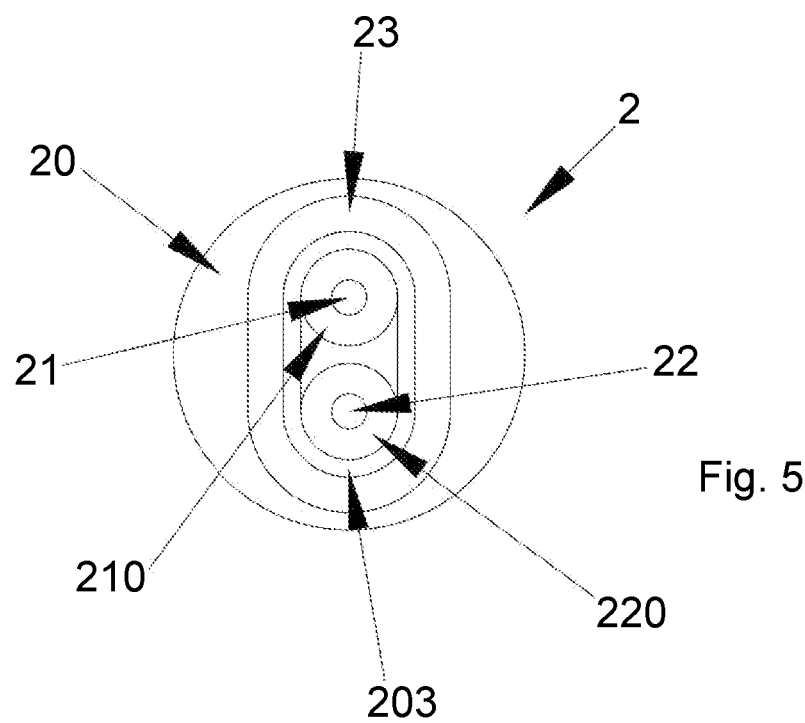
FIG. 5 illustrates a sectional view of the heating cable of FIG. 4.

The heating cable 2 is shown in FIGS. 4 and 5, on the understanding that such Figures are also representative of the heating cable 3.

Each heating cable 2, 3 comprises a respective electrically insulating sheath 20. The sheath 20 is an external sheath, i.e. it is the outermost part of the heating cable 2, 3.

Preferably, each heating cable 2, 3, in particular, each sheath 20, has an external diameter from 2 to 5 mm, for example, from 3 to 5 mm, so that the heating cable 2, 3 has an adequate resistance to breaking.

Inside the sheath 20, there is provided at least one electrically conductive wire 21, 22, in particular made of metal, adapted to generate heat when it is crossed by electric current. Preferably, two electrically conductive wires 21, 22 are provided (as shown in FIGS. 4 and 5), although only one electrically conductive wire may be provided, or two or more electrically conductive wires.

Note that each of the electrically conductive wires 21, 22 can optionally form a respective bundle, for example, an interwoven bundle of conductive wires 21, 22. For example, a bundle of conductive wires 21 and a bundle of conductive wires 22 may be provided. The conductive wire 21 is provided with a respective electrically insulating sheath 210.

When a bundle of conductive wires 21 is provided, all of the wires of the bundle of conductive wires 21 are arranged in the sheath 210. Similarly, the conductive wire 22, or the bundle of conductive wires 22, is provided with a respective sheath 220. Preferably, an electrically conductive element 23 is provided, in particular made of metal, surrounding, in particular, enveloping the conductive wires 21, 22. In particular, the conductive element 23 is arranged between the sheath 20 and the two sheaths 210, 220 of the two conductive wires 21, 22.

Preferably, a further electrically insulating sheath 203 is provided, which envelops the two conductive wires 21, 22, in particular the sheaths 210, 220 thereof. In other words, the conductive wires 21, 22, comprising the sheaths 210, 220 thereof, are arranged inside the sheath 203.

The sheath 203 is arranged between the sheaths 210, 220 and the conductive element 23. In particular, the sheath 203 is inside the conductive element 23. The sheath 203 is substantially a secondary, or supplementary insulating element.

The conductive element 23 is adapted to be connected to the ground power supply, or ground power line. Thus, advantageously, the conductive element 23 is adapted to serve as a means of protection from electric shocks. Furthermore, advantageously, the conductive element 23 serves as an element for shielding against electromagnetic interference. In particular, the conductive element 23 is adapted to confine the electromagnetic waves, which may be generated during the passage of electric current in the conductive wires 21, 22.

Furthermore, advantageously, the conductive element 23 provides a physical or mechanical protection. For example, a sharp or pointed body, which accidentally penetrates the sheath 20, can be blocked by the element 23. Since the element 23 can be placed electrically on the ground, if the hypothetical sharp or pointed body were to reach the lead wires 21, 22, the protective means, for example, a differential, would be triggered. Thus, the conductive element 23 allows for a more resistant and electrically safer heating cable 2, 3. Preferably, the conductive element 23 comprises or is formed by a plurality of electrically conductive wires, which are mutually interwoven.

By way of an illustrative and non-limiting example, the aforesaid sheaths can be made, for example, of a polymer material.

The two heating cables 2, 3 are arranged between the metal plate 1 and the net 4. Preferably, the two heating cables 2, 3 are parallel to each other. Preferably, the two heating cables 2, 3 are arranged as a coil. For example, each heating cable 2, 3 comprises substantially rectilinear sections connected to one another by a respective curved section.

Figure 1A:
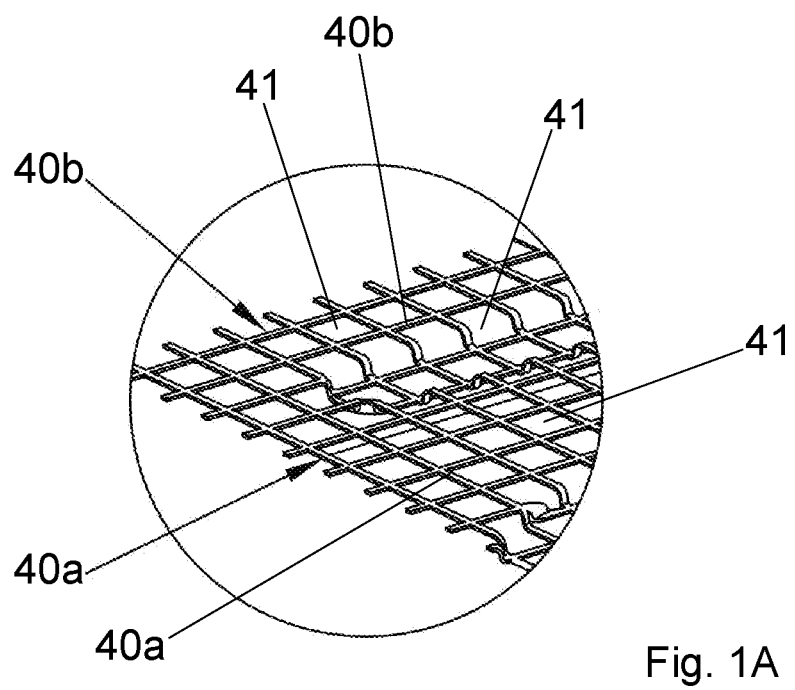
FIG. 1A illustrates an enlarged detail of FIG. 1.

The net 4 is provided with a plurality of meshes, only some of which are indicated in FIG. 1A with reference 41. The meshes 41 are through openings, i.e. empty spaces. Preferably, the dimensions, or extension of the mesh 41 are from 16 to 900 mm$^2$, for example, about 100 mm$^2$. By way of a non-limiting example, the meshes can have an area from 4×4 mm to 30×30 mm (width×length). Advantageously, the meshes 41 are adapted to allow the passage of an adhesive 50 (FIG. 2), which will be described in further detail.

The net 4 is substantially a layer, in particular, a layer shaped as a grid.

Preferably, the net 4 has a surface extension, which substantially covers the whole area, or zone occupied by the heating cables 2, 3.

Preferably, the net 4 comprises, or is formed by a plurality of first strips 40a (FIG. 1A) and a plurality of second strips 40b arranged so as to delimit said plurality of meshes 41. Preferably, the strips 40a, 40b are substantially flat. Note that only some of the first strips 40a and only some of the second strips 40b are indicated with a reference numeral in FIG. 1A.

More specifically, preferably, the first strips 40a are spaced apart and substantially parallel to one another. The second strips 40b are spaced apart and substantially parallel to one another. The first strips 40a and the second strips 40b are transversal, for example, substantially orthogonal to one another.

Each mesh 41 is delimited by two first strips 40a consecutive to each other, and by two second strips 40b consecutive to each other. The perimeter of each mesh 41 is, for example, rectangular or square.

It should be clear that instead of the net 4, a layer can be provided, provided with a plurality of openings 41 or holes. The openings or holes can be, for example, round or another shape.

Preferably, the net 4 has a thickness from 0.05 to 2 mm, for example, from 0.2 to 0.5 mm.

The thickness of the net 4 substantially corresponds to the thickness of each strip 40a, 40b.

Preferably, the net 4 is made of an electrically insulating material. The net 4 is capable of withstanding elevated temperatures, for example, it is made of a material having a softening point, which is at least greater than 150° C. at atmospheric pressure.

By way of example, the net 4 is made of a composite material, for example, a composite comprising glass fibers.

Preferably, each strip 40a, 40b has a width from 4 to 30 mm. The length of each strip 40a, 40b is greater, in particular, much greater, than the width and with respect to the thickness of each strip 40a, 40b. Preferably, the width of each strip 40a, 40b is greater than the thickness of each strip 40a, 40b.

By way of a non-limiting example, the floor panel 100, in particular, the net 4 has a rectangular shape or outline.

Advantageously, the floor panel, in particular the net, can also have more complex shapes or outlines.

Figure 6:
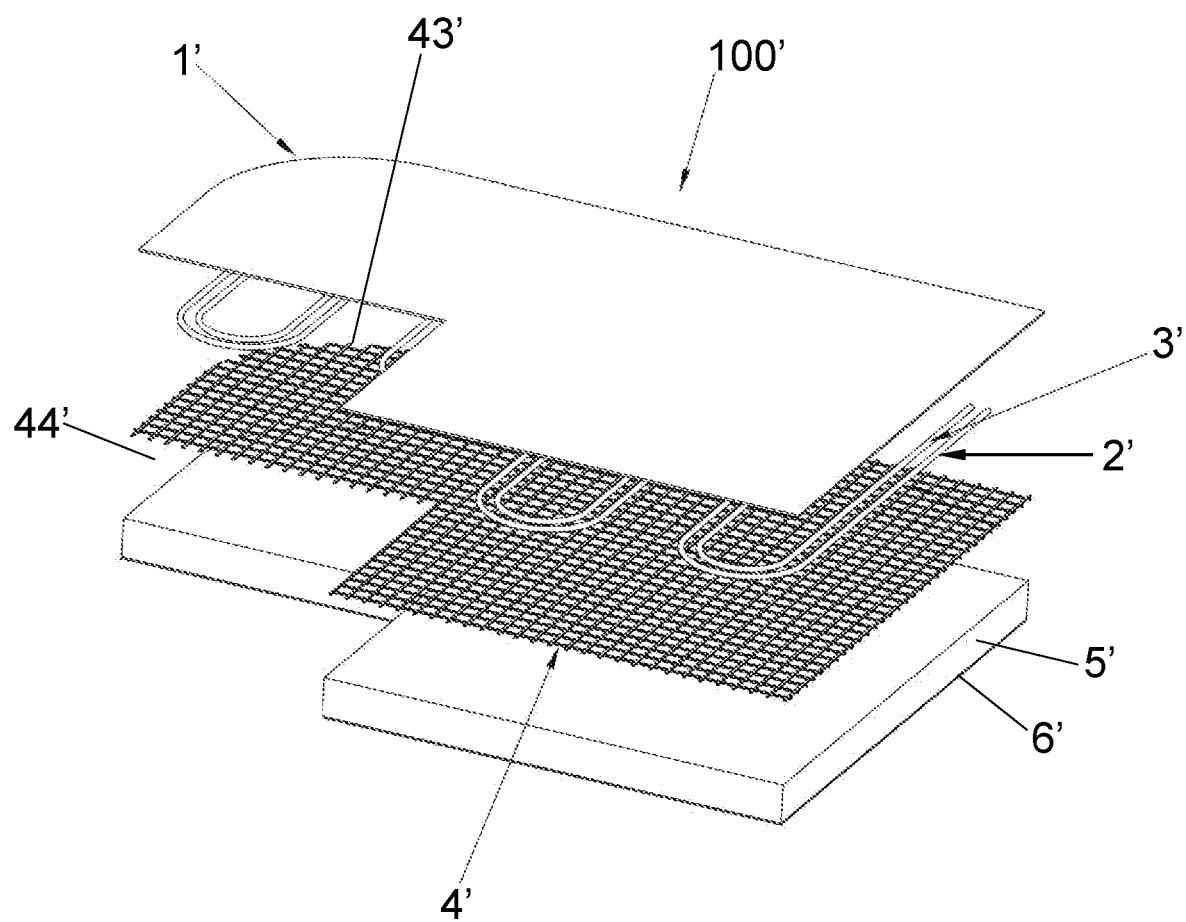
FIG. 6 illustrates a particular example of a floor panel according to the invention.

By way of a non-limiting example, note the net 4' of a floor panel 100' illustrated in FIG. 6.

The net 4' can be obtained, for example, by cutting a net with a rectangular shape. In particular, if compared with a rectangular net, the net 4' comprises an incision 44' and a portion 43' with a curved outline, for example, shaped as an arc of a circle.

The spatial distribution of the heating cables 2', 3' can be adapted as a function of the shape of the net 4'.

Preferably, the metal plate 1', the layer 5' and the plate 6' also have a profile, which is similar, or substantially similar to that of the net 4'.

Note that, apart from geometric differences, the metal plate 1', the heating cables 2', 3', the net 4', the layer 5' and the plate 6' are equal, or substantially equal to the metal plate 1, the heating cables 2, 3, the net 4, the layer 5 and the plate 6.

In general, the net 4, 4', which is used, in particular, as a support for the heating cables 2, 2', 3, 3', allows elevated realization versatility of the floor panels, whose shape can be made depending on the zone of installation, without requiring the use of templates.

The floor panel can be installed, for example, in a lower zone of the toilet of a railway carriage or of a ship.

Preferably, at least one side, for example, one side of the net 4 is adhesive. In particular, the adhesive side is the side facing the metal plate 1.

In particular, a face of each strip 40a, 40b facing the metal plate 1 is adhesive.

By providing an adhesive side of the net 4, the assembly operation is particularly facilitated.

The adhesive side is attached, i.e. adheres both to the two heating cables 2, 3 and to the metal plate 1.

In particular, some portions of the net 4 adhere to the heating cables 2, 3 and other portions adhere to the metal plate 1 (FIG. 2).

If the adhesive side of the net 4 is not provided (i.e. with or without the adhesive side), preferably, the net 4 is nonetheless directly in contact with the metal plate 1 and with the heating cables 2, 3.

The net 4 is flexible, so as to be in contact both with the metal plate 1 and with the heating cables 2, 3 interposed in some zones between the net 4 and the metal plate 1.

Preferably, the net 4 and the two heating cables 2, 3 are sewn to each other, for example, by means of wires. Preferably, the net 4 and the two heating cables 2, 3 are sewn to each other in various points or zones. Advantageously, by sewing the heating cables 2, 3 to the net 4, it is guaranteed that the heating cables 2, 3 are already in the conformation chosen in accordance with the design. The constraint provided by the sewing can be provided additionally or alternatively to the constraint provided by the adhesive side.

As can be noted in FIG. 2, the heating cables 2, 3 are in contact, in particular directly in contact, with the metal plate 1 and with the net 4. In particular, the external sheath 20 of the two heating cables 2, 3 (or more generally, of the at least one heating cable 2, 3) is in contact, in particular directly in contact, with the metal plate 1 and with the net 4. Thus, the transmission of heat from the heating cables 2, 3 to the metal plate 1 is optimized.

Preferably, the floor panel 100 also comprises a layer 5, or a layer of material. In particular, the layer 5 is adapted to limit the transmission of heat produced by the heating cables 2, 3, so as to direct the heat towards the metal plate 1. In particular, the layer 5 is a layer of thermally insulating and preferably, electrically insulating material. The layer 5 is a panel in itself.

Advantageously, channels obtained in the plate 1 and/or in the layer 5 where the heating cables 2, 3 are accommodated, are not necessary. Thus, preferably, the face 12 of the plate 1 and/or the face 51 of the layer 5 facing the plate 1 can be substantially flat. Advantageously, in particular, said at least one heating cable 2, 3 is arranged between the layer 5 and the metal plate 1, in particular, between the face 51 and the face 12. In particular, said at least one heating cable 2, 3 is not incorporated in the layer 5. In other words, preferably, said at least one heating cable 2, 3 is completely external to the layer 5.

Advantageously, the space between the plate 1 and the layer 5 can be filled by an adhesive 50, which will be described in further detail. Preferably, the layer 5 has a thickness from 5 to 50 mm, for example, from 15 to 25 mm.

Preferably, the layer 5 is made of a polymer or plastic material, preferably of a polymer foam. For example, the layer 5 can be made of a polystyrene foam, which is thermally insulating and has an optimum resistance to compression.

The net 4 is arranged between the layer 5 and the metal plate 1.

The layer 5 is fixed to the metal plate 1, preferably by means of an adhesive 50. Advantageously, the meshes 41 of the net 4 allow the fixing, in particular, by means of the adhesive 50, between the layer 5 and the metal plate 1.

The layer 5 is also fixed to the net 4, preferably by means of said adhesive 50.

The adhesive 50 for example, can be of the polymer type, in particular mono-component or bi-component. In general, the adhesive 50 is adapted to realize a structural bonding. Preferably, the adhesive 50 is adapted to be mechanically activated, with application of a pressure.

Advantageously, the adhesive 50 allows the layer 5 and the plate 1 to be fixed to each other, and it also allows the heat produced by the at least one heating element 2, 3 to be adequately transmitted to the plate 1. In fact, the adhesive 50 is substantially a means which allows the thermal inertia or insulation to be increased.

Preferably, the at least one heating cable 2, 3 is substantially immersed or included in the adhesive 50, preferably and advantageously except for a surface portion, which is in contact, in particular directly in contact, with the metal plate 1. Preferably, the net 4 is also substantially immersed or included in the adhesive 50.

In other words, preferably, said at least one heating cable 2, 3 is at least partially, preferably partially (in particular, only partially), included or immersed in said adhesive 50 and/or said net 4 is at least partially, for example, partially (in particular, only partially), included or immersed in said adhesive 50.

Preferably, the adhesive 50 has a density (mass/volume) greater than the density of the layer 5.

Preferably, in some zones of the floor panel 100, in particular at the meshes 41 where the at least one heating cable 2, 3 is not present, between the plate 1 and the layer 5, only the adhesive 50 is present. In other words, in some zones, the layer 5 is fixed directly to the plate 1 by means of the adhesive 50.

Preferably, the floor panel 100 comprises a further plate 6 preferably made of metal, preferably made of aluminum or aluminum alloy. Preferably, the plate 6 has a thickness from 0.5 to 5 mm, for example, from 1 to 2 mm.

The layer 5 is arranged between the metal plate 1 and said further plate 6.

Preferably, the layer 5 is in contact with the plate 6. In particular, the layer 5 and the plate 6 are fixed to each other.

The floor panel 100, which comprises the metal plate 1, the one or more heating cables 2, 3, the net 4, the layer 5 and preferably also the plate 6, is particularly adapted to be stepped on, i.e., it has adequate structural characteristics to be stepped on without causing the floor panel 100 to break.

Preferably, the floor panel 100 has a substantially rectangular shape, although it can also have other shapes, as shown, for example, in FIG. 6. Preferably, the floor panel 100 has a surface extension (width×length) from 0.25 to 10 m$^2$. For example, the floor panel 100 can have a surface extension of 500 mm×500 mm or of 2000 mm×5000 mm.

An example of a process for obtaining a floor panel 100 according to the invention comprises the steps of:
- providing said at least one heating cable 2, 3 constrained, preferably sewn, to the net 4;
- arranging the net 4 and said at least one heating cable 2, 3 in contact with the metal plate 1;
- fixing the layer 5 of material to the metal plate 1, preferably by means of an adhesive 50.

Preferably, the layer 5 is provided with the plate 6, and the layer 5 is fixed to the metal plate 1 so that the layer 5 is between the metal plate 1 and the plate 6.

Preferably, two heating cables 2, 3 are provided, which are constrained, in particular sewn, to the net 4.

The process can be carried out particularly quickly and easily.

Preferably, the component comprising at least one heating cable 2, 3, for example, two heating cables 2, 3, and the net 4 is a pre-assembled component. Furthermore, preferably, the layer 5 and the plate 6 also form a pre-assembled component.

Advantageously, the adhesive 50 can pass through the meshes 41, or openings, of the net 4, so that the layer 5 and the plate 1 can be fixed to each other by means of the adhesive 50. It is evident that the component comprising the heating cables 2, 3 and the net 4 is also fixed in position when the layer 5 is fixed to the metal plate 1 by means of the adhesive 50.

To further facilitate the process, preferably, one side of the net 4 is adhesive, as described previously. In this way, the component comprising the net 4 and the heating cables 2,3 can adhere to the metal plate 1, and such component is already held in position before using the adhesive 50, which fixes the layer 5 to the metal plate 1.

In particular, in the light of the present description, it is possible to understand that by providing a component comprising at least one heating cable 2, 3 constrained to the net 4, preferably sewn to the net 4, it is possible to obtain a heating floor panel quickly and easily, which can potentially have different features to those described previously.

The invention claimed is:

1. A floor panel for transport means comprising:
   a metal plate;
   at least one heating cable adapted to generate heat when electric current flows therethrough;
   a net provided with a plurality of openings;
   wherein said at least one heating cable is arranged between the net and the metal plate;
   wherein said at least one heating cable is in contact with the metal plate;
   the floor panel comprising a layer, said layer being adapted to limit a transmission of heat produced by the at least one heating cable;
   wherein the net is arranged between said layer and the metal plate;
   wherein said layer is fixed to the metal plate by an adhesive;
   wherein said at least one heating cable is immersed in said adhesive except for a surface portion of the at least one heating cable which is in contact with the metal plate.

2. The floor panel according to claim 1, wherein said at least one heating cable is constrained to the net.

3. The floor panel according to claim 1, wherein the net comprises an adhesive side attached to said at least one heating cable and to the metal plate.

4. The floor panel according to claim 1, wherein said at least one heating cable is directly in contact with the metal plate.

5. The floor panel according to claim 1, wherein a-dimension of each opening of the net is from 16 to 900 mm$^2$.

6. The floor panel according to claim 1, comprising a further plate; wherein said layer is arranged between the metal plate and said further plate.

7. The floor panel according to claim 1, wherein said at least one heating cable comprises an external sheath, which is electrically insulating, inside which there is provided at least one electrically conductive wire adapted to generate heat when electric current flows therethrough.

8. The floor panel according to claim 7, wherein said external sheath is in contact with the metal plate.

9. The floor panel according to claim 7, wherein said external sheath is in contact with the net.

10. The floor panel according to claim 7, wherein inside the external sheath there is provided an electrically conductive element adapted to be connected to an electrical ground connection.

11. The floor panel according to claim 7, comprising two electrically conductive wires, each adapted to generate heat when electric current flows therethrough.

12. The floor panel according to claim 1, comprising two or more heating cables of said at least one heating cable, each adapted to generate heat when electric current flows therethrough.

13. A method for obtaining a floor panel according to claim 1, wherein at least the following steps are provided:
   providing said at least one heating cable constrained to the net provided with said plurality of openings;
   arranging the net and said at least one heating cable in contact with the metal plate;
   and fixing a layer, said layer being adapted to limit the transmission of the heat produced by the at least one heating cable to the metal plate.

* * * * *